(12) United States Patent
Miao et al.

(10) Patent No.: US 12,098,911 B2
(45) Date of Patent: Sep. 24, 2024

(54) MEASUREMENT DEVICE, MEASUREMENT METHOD, AND COMPUTER-READABLE STORAGE MEDIUM STORING A MEASUREMENT PROGRAM

(71) Applicant: OMRON Corporation, Kyoto (JP)

(72) Inventors: Lin Miao, Kyoto (JP); Xingdou Fu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 332 days.

(21) Appl. No.: 17/611,926

(22) PCT Filed: Jun. 17, 2019

(86) PCT No.: PCT/JP2019/023978
§ 371 (c)(1),
(2) Date: Nov. 17, 2021

(87) PCT Pub. No.: WO2020/255229
PCT Pub. Date: Dec. 24, 2020

(65) Prior Publication Data
US 2022/0228851 A1 Jul. 21, 2022

(51) Int. Cl.
*G01B 11/00* (2006.01)
*B25J 13/08* (2006.01)
(Continued)

(52) U.S. Cl.
CPC ........... *G01B 11/005* (2013.01); *B25J 13/088* (2013.01); *B25J 19/021* (2013.01); *G06T 7/30* (2017.01);
(Continued)

(58) Field of Classification Search
CPC ....... G01B 11/005; G01B 11/14; G01B 11/22; B25J 13/088; B25J 13/089; B25J 19/04;
(Continued)

(56) References Cited

U.S. PATENT DOCUMENTS

2006/0290945 A1 12/2006 Kubo et al.
2008/0253612 A1* 10/2008 Reyier ................... B25J 9/1697
901/6
(Continued)

FOREIGN PATENT DOCUMENTS

CN 101542520 A 9/2009
CN 105190229 A 12/2015
(Continued)

OTHER PUBLICATIONS

Chinese Office Action issued on Jun. 8, 2023 in a counterpart Chinese patent application.
(Continued)

*Primary Examiner* — Son T Le
*Assistant Examiner* — Brian Butler Geiss
(74) *Attorney, Agent, or Firm* — METROLEX IP LAW GROUP, PLLC; Robert L. Scott, Esq.

(57) ABSTRACT

Values of parameters specifying conditions for obtaining 3D measurement data representing a measurement object are output as values satisfying a condition designated by a user. The technique includes setting and changing, within a predetermined range, values of parameters specifying conditions for obtaining 3D measurement data represented by 3D coordinates indicating points on a surface of the measurement object, measuring the measurement object to obtain 3D data sets representing the measurement object based on the parameter values resulting from the setting or the change, registering the 3D data sets, storing an identification result of the measurement object based on 3D data obtained through the registration in association with the parameter values, receiving, from a user, designation of a priority condition for obtaining 3D measurement data, and outputting a combination(s) of values of parameters satisfying the priority condition based on association between identifica-
(Continued)

tion results of the measurement object and the parameter values.

6 Claims, 9 Drawing Sheets

(51) Int. Cl.
 *B25J 19/02* (2006.01)
 *G06T 7/30* (2017.01)
(52) U.S. Cl.
 CPC .............................. *G06T 2200/04* (2013.01); *G06T 2207/10028* (2013.01)
(58) Field of Classification Search
 CPC ............. G06T 2200/04; G06T 2200/08; G06T 2207/10028
 See application file for complete search history.

(56) References Cited

U.S. PATENT DOCUMENTS

| | | |
|---|---|---|
| 2010/0098324 A1 | 4/2010 | Fujieda |
| 2010/0156896 A1 | 6/2010 | Ichimura et al. |
| 2010/0232682 A1 | 9/2010 | Fujieda et al. |
| 2016/0042523 A1 | 2/2016 | Unten et al. |
| 2016/0356882 A1 | 12/2016 | Glas et al. |
| 2017/0139407 A1 | 5/2017 | Sakaguchi et al. |
| 2018/0262656 A1* | 9/2018 | Uchida .................... H04N 5/04 |

FOREIGN PATENT DOCUMENTS

| | | |
|---|---|---|
| CN | 105874350 A | 8/2016 |
| JP | H8-257960 A | 10/1996 |
| JP | H11-3490 A | 1/1999 |
| JP | 2007-3285 A | 1/2007 |
| JP | 2009-128075 A | 6/2009 |
| JP | 2010-32331 A | 2/2010 |
| JP | 2010-121999 A | 6/2010 |
| JP | 2010-210586 A | 9/2010 |

OTHER PUBLICATIONS

Ryuji Ono, et al., "3D Image Recognition Based on Extracted Key Points", The 77th National Convention of Information Processing Society of Japan; Mar. 17, 2015-Mar. 19, 2015, pp. 1-272 and/to 1-272, Kyoto, Japan; Concise explanation of relevance provided in the specification.
English translation of the International Search Report ("ISR") of PCT/JP2019/023978 mailed on Aug. 6, 2019.
Written Opinion("WO") of PCT/JP2019/023978 mailed on Aug. 6, 2019.
extended European search report (EESR) issued on Jul. 26, 2022 in a counterpart European patent application.

* cited by examiner

MEASUREMENT DEVICE, MEASUREMENT METHOD, AND COMPUTER-READABLE STORAGE MEDIUM STORING A MEASUREMENT PROGRAM

FIELD

The disclosure relates to a measurement device, a measurement method, and a measurement program.

BACKGROUND

In factory automation, a known technique measures multiple point clouds with the three-dimensional (3D) coordinates indicating different points on surfaces of a workpiece from multiple measurement points using, for example, a range sensor. The measurement points are at different positions with respect to the workpiece. A specific point cloud is selected from the multiple measured point clouds as a reference for registration by which the positions and the orientations of the other point clouds are aligned with the position and the orientation of the reference point cloud. The point cloud after the registration is used for workpiece identification. Non-Patent Literature 1 describes registration of multiple point clouds measured at multiple different measurement points.

CITATION LIST

Patent Literature

Non-Patent Literature 1: Ryuji Ono, Keiko Ono, 3D Image Recognition Based on Extracted Key Points, The 77th National Convention of Information Processing Society of Japan

SUMMARY

The accuracy of workpiece identification may vary depending on the values of multiple parameters that specify the conditions for measuring each point cloud (e.g., the number of times the point clouds are measured, the time intervals at which the point clouds are measured, the movement distance of the range sensor, the movement speed of the range sensor, the angle at which the range sensor measures the workpiece, the focus range of the range sensor, or the position coordinates of each measurement point). When, for example, the range sensor is moved slower and measures point clouds more times, workpiece identification may be performed with a sufficiently large number of point clouds with sufficiently high quality and thus with improved accuracy. In contrast, when the range sensor is moved faster and measures point clouds more times, workpiece identification is performed with an insufficient number of point clouds with insufficient quality and thus with decreased accuracy. When the range sensor is moved faster, the range sensor may be adjusted to measure point clouds an appropriate number of times. In this case, workpiece identification may be performed with an appropriate number of point clouds with appropriate quality and with relatively improved accuracy. However, when the range sensor is moved slower to improve the accuracy of workpiece identification, the range sensor takes more time to measure point clouds and may not achieve high productivity aimed in factory automation.

As described above, the accuracy of workpiece identification or the productivity may vary with different combinations of the values of the parameters specifying the conditions for measuring the point clouds. The relationship remains undefined between a change in each parameter value and the resultant change in the accuracy of workpiece identification or the productivity. The parameters specifying the conditions for measuring the point clouds are to be set to satisfy the conditions intended by the user for measuring point clouds based on the accuracy of workpiece identification or productivity. However, manually setting optimum values for the parameters is not easy.

One or more embodiments are directed to a measurement device, a measurement method, and a measurement program for outputting values satisfying conditions designated by a user as the values of parameters specifying conditions for obtaining 3D measurement data representing a measurement object.

A measurement device according to one or more embodiments may include a three-dimensional sensor mountable on a robot, a parameter setter, a drive controller, a sensor controller, a registration processor, a storage, an input unit, and an output unit. The three-dimensional sensor measures a measurement object to obtain three-dimensional data sets represented by three-dimensional coordinates indicating points on a surface of the measurement object. The parameter setter sets and changes, within a predetermined range, values of a plurality of parameters specifying conditions for obtaining the three-dimensional data sets by measurement. The three-dimensional data sets are obtained by measurement at a plurality of measurement points at which the three-dimensional sensor is at different positions with respect to the measurement object. The three-dimensional data sets may include a three-dimensional data set obtained by measurement at a specific measurement point of the plurality of measurement points and a three-dimensional data set obtained by measurement at a measurement point other than the specific measurement point. The three-dimensional data set obtained by measurement at the measurement point other than the specific measurement point is a data set to be registered to the three-dimensional data set obtained by measurement at the specific measurement point. The drive controller outputs, based on the parameter values resulting from the setting or the change, a drive command instructing a driver that drives a joint of the robot to change a position of the three-dimensional sensor with respect to the measurement object. The sensor controller controls, based on the parameter values resulting from the setting or the change, the three-dimensional sensor to measure the measurement object at the plurality of measurement points to obtain the three-dimensional data sets representing the measurement object. The registration processor registers the three-dimensional data set obtained by measurement at the measurement point other than the specific measurement point to the three-dimensional data set obtained by measurement at the specific measurement point. The storage stores a result from identifying the measurement object based on three-dimensional data obtained through the registration in association with the parameter values resulting from the setting or the change. The input unit receives, from a user, designation of a priority condition for obtaining three-dimensional data by measurement. The output unit outputs one or more combinations of values of parameters satisfying the priority condition based on association between identification results of the measurement object and the parameter values resulting from the setting or the change. The one or more combinations are arranged in order of a higher degree of satisfying the priority condition. The user simply selects one of the combinations of the values of the parameters output as combinations that satisfy the priority condition designated by the user. This eliminates complicated manual adjustment of the parameters. The user may thus easily and rapidly set the parameters satisfying the priority condition designated by the user without complicated parameter adjustment.

The plurality of parameters specifying the conditions for obtaining the three-dimensional data sets by measurement may include at least one parameter selected from the group consisting of the number of times measurement is performed to obtain the three-dimensional data sets, a movement distance of the three-dimensional sensor, a movement speed of the three-dimensional sensor, time intervals at which measurement is performed to obtain the three-dimensional data sets, an angle at which the three-dimensional sensor measures the measurement object, a focus range of the three-dimensional sensor, and position coordinates of each of the plurality of measurement points. Setting the above parameters may allow customization of the conditions for obtaining 3D measurement data to satisfy the priority condition designated by the user.

The predetermined range of values for each parameter specifying the conditions for obtaining the three-dimensional data sets by measurement may be estimated to satisfy the priority condition designated by the user using the input unit. Narrowing the predetermined range of values for each parameter specifying the conditions for obtaining 3D measurement data to a range of values estimated to satisfy the priority condition designated by the user reduces the number of measurement processes for 3D data and the number of registration processes for parameter setting, thus may be allowing easy and rapid setting of the parameters satisfying the priority condition designated by the user.

A measurement method according to one or more embodiments may be implementable by a measurement device including a three-dimensional sensor mountable on a robot. The three-dimensional sensor measures a measurement object to obtain three-dimensional data sets represented by three-dimensional coordinates indicating points on a surface of the measurement object. The measurement method may include setting and changing values, outputting a drive command, controlling the three-dimensional sensor, registering the three-dimensional data sets, storing an identification result, receiving designation, and outputting one or more combinations. The setting and changing the values may include setting and changing, within a predetermined range, values of a plurality of parameters specifying conditions for obtaining the three-dimensional data sets by measurement. The three-dimensional data sets are obtained by measurement at a plurality of measurement points at which the three-dimensional sensor is at different positions with respect to the measurement object. The three-dimensional data sets may include a three-dimensional data set obtained by measurement at a specific measurement point of the plurality of measurement points and a three-dimensional data set obtained by measurement at a measurement point other than the specific measurement point. The three-dimensional data set obtained by measurement at the measurement point other than the specific measurement point is a data set to be registered to the three-dimensional data set obtained by measurement at the specific measurement point. The outputting the drive command may include outputting, based on the parameter values resulting from the setting or the change, a drive command instructing a driver that drives a joint of the robot to change a position of the three-dimensional sensor with respect to the measurement object. The controlling the three-dimensional sensor may include controlling, based on the parameter values resulting from the setting or the change, the three-dimensional sensor to measure the measurement object at the plurality of measurement points to obtain the three-dimensional data sets representing the measurement object. The registering the three-dimensional data sets may include registering the three-dimensional data set obtained by measurement at the measurement point other than the specific measurement point to the three-dimensional data set obtained by measurement at the specific measurement point. The storing the identification result may include storing a result from identifying the measurement object based on three-dimensional data obtained through the registration in association with the parameter values resulting from the setting or the change. The receiving the designation may include receiving, from a user, designation of a priority condition for obtaining three-dimensional data by measurement. The outputting one or more combinations may include outputting one or more combinations of values of parameters satisfying the priority condition based on association between identification results of the measurement object and the parameter values resulting from the setting or the change. The one or more combinations are arranged in order of a higher degree of satisfying the priority condition. The user simply selects one of the combinations of the values of the parameters output as combinations that satisfy the priority condition designated by the user. This eliminates complicated manual adjustment of the parameters. The user may thus easily and rapidly set the parameters satisfying the priority condition designated by the user without complicated parameter adjustment.

A measurement program according to one or more embodiments is a program that may be executable by a measurement device including a three-dimensional sensor mountable on a robot. The three-dimensional sensor measures a measurement object to obtain three-dimensional data sets represented by three-dimensional coordinates indicating points on a surface of the measurement object. The measurement program may be executable by the measurement device to perform operations including setting and changing values, outputting a drive command, controlling the three-dimensional sensor, registering the three-dimensional data sets, storing an identification result, receiving designation, and outputting one or more combinations. The setting and changing the values may include setting and changing, within a predetermined range, values of a plurality of parameters specifying conditions for obtaining the three-dimensional data sets by measurement. The three-dimensional data sets are obtained by measurement at a plurality of measurement points at which the three-dimensional sensor is at different positions with respect to the measurement object. The three-dimensional data sets may include a three-dimensional data set obtained by measurement at a specific measurement point of the plurality of measurement points and a three-dimensional data set obtained by measurement at a measurement point other than the specific measurement point. The three-dimensional data set obtained by measurement at the measurement point other than the specific measurement point is a data set to be registered to the three-dimensional data set obtained by measurement at the specific measurement point. The outputting the drive command may include outputting, based on the parameter values resulting from the setting or the change, a drive command instructing a driver that drives a joint of the robot to change a position of the three-dimensional sensor with respect to the measurement object. The controlling the three-dimensional sensor may include controlling, based on the parameter values resulting from the setting or the change, the three-dimensional sensor to measure the measurement object at the plurality of measurement points to obtain the three-dimensional data sets representing the measurement object. The registering the three-dimensional data sets may include registering the three-dimensional data set obtained by measurement at the measurement point other than the specific measurement point to the three-dimensional data set obtained by measurement at the specific measurement point. The storing the identification result may include storing a result from identifying the measurement object based on three-dimensional data obtained through the registration in association with the parameter values resulting from the setting or the change. The receiving the designation may include receiving, from a user, designation of a priority condition for obtaining three-dimensional data by measurement. The outputting one or more combinations may include outputting one or more combinations of values of parameters satisfying the priority condition based on association between identification results of the measurement object and the parameter values resulting from the setting or the change. The one or more combinations are arranged in order of a higher degree of satisfying the priority condition. The user simply selects one of the combinations of the values of the parameters output as combinations that satisfy the priority condition designated by the user. This eliminates complicated manual adjustment of the parameters. The user simply selects one of the combinations of the values of the parameters output as combinations that satisfy the priority condition designated by the user. This eliminates complicated manual adjustment of the parameters. The user [can] may thus easily and rapidly set the parameters satisfying the priority condition designated by the user without complicated parameter adjustment.

The technique according to one or more embodiments may allow the values of the parameters specifying the conditions for obtaining the 3D measurement data representing a measurement object to be output as values that satisfy the condition designated by the user.

DETAILED DESCRIPTION

Figure 1:
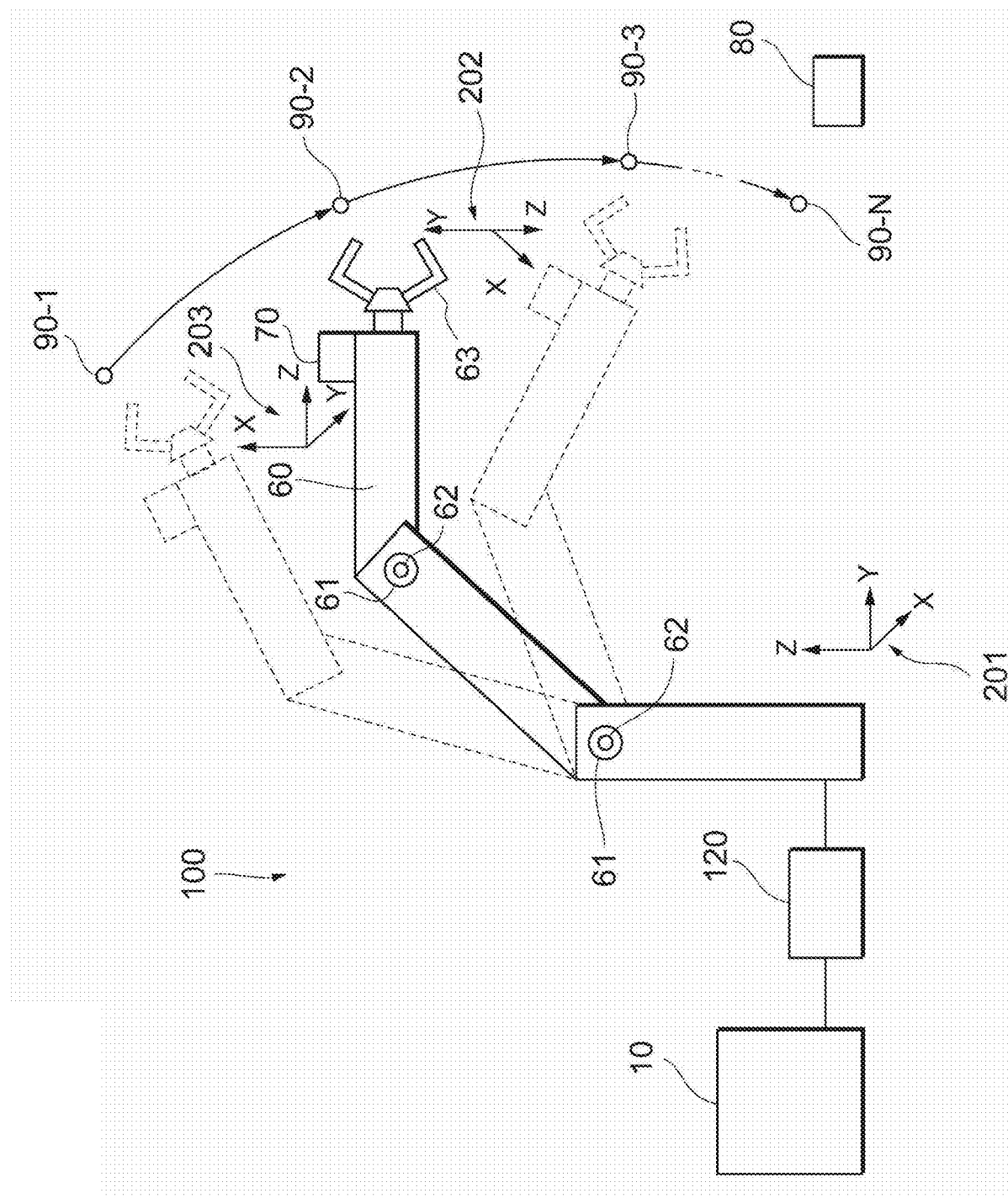
FIG. 1 is a diagram illustrating a measurement system in one or more embodiments showing an overall structure.

One or more embodiments according to one aspect of the present invention will now be described with reference to the drawings. The embodiments are described for easy understanding of the present invention and do not limit the present invention. The present invention may be modified or improved without departing from the spirit and scope of the present invention. The present invention covers the equivalents that fall within the scope of the present invention. The same components are given the same reference numerals, and will not be described repeatedly.

Overall Structure

FIG. 1 is a diagram of a measurement system 100 in an embodiment of the present invention showing its overall structure. The measurement system 100 includes a robot 60, a three-dimensional (3D) sensor 70 mounted on the robot 60, a computer system 10 that controls driving of the robot 60 and measurement for 3D data representing a measurement object 80 performed by the 3D sensor 70, and a robot controller 120 that controls the motion of the robot 60 in response to a command from the computer system 10.

The 3D data is represented by the 3D coordinates indicating points on surfaces of the measurement object 80. For example, the 3D data may include a point cloud or a range image. A point cloud is, for example, a set of points each having 3D coordinates (x, y, z) in an orthogonal xyz coordinate system. A range image is, for example, a set of pixels each having a pixel value indicating a distance d corresponding to two-dimensional (2D) image coordinates (u, v) in an orthogonal uv coordinate system. The distance d is a distance between the 3D sensor 70 and the measurement object 80.

The 3D sensor 70 may be a range sensor that measures a point cloud or a range image sensor combining a range sensor and a 2D sensor to obtain a range image. The range sensor measures the distance d as depth information. The range sensor may use, for example, trigonometry, time of flight, or a phase difference in measurement. The 2D sensor is an image sensor that captures a 2D image. A 2D image differs from a range image in not using the distance d as its pixel value. The range image sensor may be, for example, a camera that captures multiple 2D images of the measurement object 80 with the 2D sensor changing its position, and obtains a range image having pixel values indicating the distances d through stereoscopic image processing. In another example, the range image sensor may be a stereo camera that captures multiple images of the measurement object 80 in different directions at a time to obtain a range image that has pixel values indicating the distances d.

The robot 60 is, for example, an articulated robot (e.g., a vertical articulated robot or a horizontal articulated robot) with a robot hand 63 for manipulating (e.g., gripping, sucking, moving, assembling, or inserting) the measurement object 80. The robot 60 includes drivers 61 for driving the joints and displacement detectors 62 for detecting displacement (angular displacement) of the joints. The drivers 61 are, for example, servomotors that are driven in response to a drive command from the robot controller 120. The displacement detectors 62 are, for example, encoders (e.g., incremental encoders or absolute encoders) that detect the rotation angles of the servomotors. The robot 60 incorporates, at each joint, the driver 61 and the displacement detector 62.

The robot 60 operates as an autonomous manipulator in various tasks such as picking, assembling, transporting, painting, inspecting, polishing, and washing the measurement object 80. The measurement object 80 is, for example, a workpiece or a part. Examples of workpieces include mechanical parts for powertrain systems of automobiles (e.g., engines and transmissions) and electronic parts for electrical systems.

The measurement system 100 controls the driving of each joint of the robot 60 to change the position of the 3D sensor 70 with respect to the measurement object 80. The measurement system 100 measures the measurement object 80 at multiple measurement points 90-1, 90-2, and 90-3 to 90-N with the 3D sensor 70 at the corresponding different positions to obtain 3D measurement data, where N is an integer greater than or equal to 2. For example, the measurement system 100 may obtain, at one or more specific measurement points of the multiple measurement points 90-1, 90-2, and 90-3 to 90-N, 3D data representing the measurement object 80 by measurement while the robot 60 is stopped and may obtain, at each measurement points other than the specific measurement points, 3D data representing the measurement object 80 by measurement while the robot 60 is in motion. For example, the measurement system 100 may measure 3D data representing the measurement object 80 at all the measurement points 90-1, 90-2, and 90-3 to 90-N while the robot 60 is stopped.

In FIG. 1, a coordinate system 201 is defined with respect to the robot 60, a coordinate system 202 is defined with respect to the robot hand 63, and a coordinate system 203 is defined with respect to the 3D sensor 70. The coordinate system 201 is referred to as a robot coordinate system, the coordinate system 202 as a tool coordinate system, and the coordinate system 203 as a sensor coordinate system.

Figure 2:
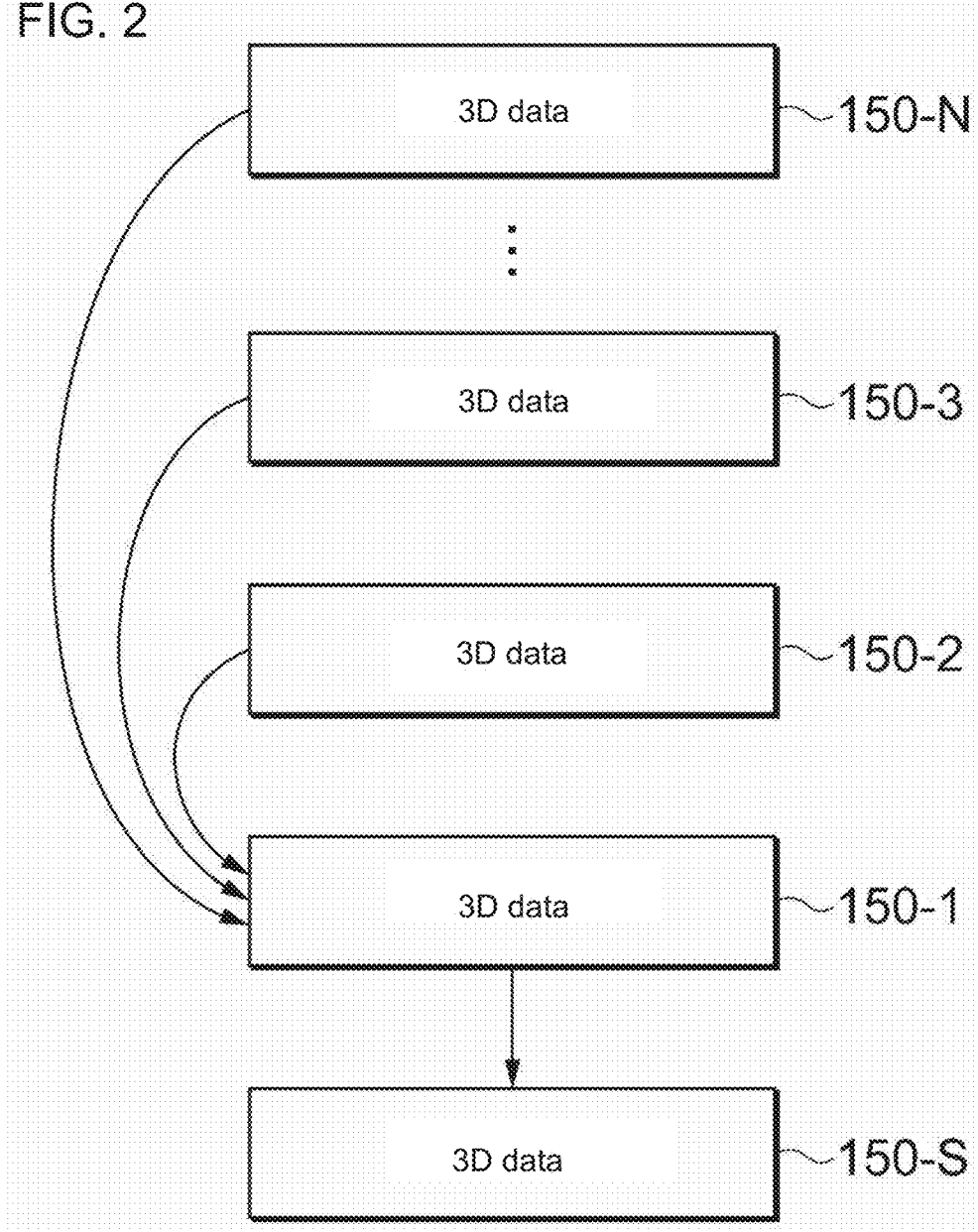
FIG. 2 is a diagram illustrating a sequence of 3D data registration in one or more embodiments.

FIG. 2 is a diagram describing a sequence of 3D data registration in the embodiment of the present invention. Registration refers to coordinate transformation for aligning the position and the orientation of one 3D data set with the position and the orientation of another 3D data set. 3D data sets 150-1, 150-2, and 150-3 to 150-N are sets of 3D data representing the measurement object 80 measured at the measurement points 90-1, 90-2, and 90-3 to 90-N. The measurement point 90-1 may be selected as a specific measurement point from the measurement points 90-1, 90-2, and 90-3 to 90-N. The 3D measurement data sets 150-2, 150-3 to 150-N obtained at the measurement points 90-2, 90-3 to 90-N other than at the specific measurement point 90-1 may each be registered to the 3D measurement data 150-1 obtained at the specific measurement point 90-1 to obtain 3D data 150-S. Any of the 3D data sets other than the 3D data 150-1 may be used as a reference for registration of the other 3D data sets.

For example, iterative closest point (ICP) may be used as a registration algorithm. For each point in one 3D data set, ICP identifies the closest point in another 3D data set and tentatively determines the closest point as a corresponding point. ICP estimates a rigid transformation that minimizes the distance between each pair of corresponding points and iterates the identification of corresponding points and the estimation of a rigid transformation to minimize the distance between each pair of corresponding points in the 3D data sets. Before execution of ICP, a known algorithm may be used to estimate the corresponding points based on the features of 3D data. Such a known algorithm may use, for example, a point pair feature (PPF).

Hardware Configuration

An example hardware configuration of the measurement system 100 and a measurement device 200 in the embodiment of the present invention will now be described with reference to FIG. 3.

The measurement device 200 includes the computer system 10 and the 3D sensor 70. The measurement system 100 includes the measurement device 200, the robot 60, and the robot controller 120. The computer system 10 includes an arithmetic unit 20, a storage 30, an input-output interface 40, and a display interface 50. The arithmetic unit 20 includes a central processing unit (CPU) 21, a read-only memory (ROM) 22, and a random-access memory (RAM) 23. The input-output interface 40 is connected to the 3D sensor 70, the robot controller 120, and an input device 130. The input device 130 is, for example, a keyboard, a mouse, or a touchpad. The display interface 50 is connected to a display 140. The display 140 is, for example, a liquid crystal display.

The storage 30 is a computer-readable recording medium, such as a disk medium (e.g., a magnetic recording medium or a magneto-optical recording medium) or a semiconductor memory (e.g., a volatile memory or a nonvolatile memory). Such a recording medium may be referred to as, for example, a non-transitory recording medium. The storage 30 stores a measurement program 31 for implementing a measurement method according to the embodiment of the present invention. The measurement program 31 is read into the RAM 23 from the storage 30 and interpreted and executed by the CPU 21. The measurement program 31 also functions as a main program for controlling the motion of the robot 60. The storage 30 also stores 3D computer-aided design (CAD) data 32 representing the measurement object 80.

The arithmetic unit 20 receives, through the input-output interface 40, an input of information indicating the displacement of each joint of the robot 60 output from the displacement detector 62 and outputs a drive command to each driver 61 that drives a corresponding joint of the robot 60.

The robot controller 120 controls, in response to the drive command output from the arithmetic unit 20 through the input-output interface 40, driving of each driver 61 (e.g., the number of rotations and the torque of the servomotor) that drives the joint of the robot 60.

The 3D sensor 70 measures, in response to a measurement command output from the arithmetic unit 20 through the input-output interface 40, the measurement object 80 to obtain 3D data sets 150-1, 150-2, and 150-3 to 150-N for the measurement object 80.

The arithmetic unit 20 outputs, through the input-output interface 40, the measurement command to instruct the 3D sensor 70 to obtain the 3D measurement data sets 150-1, 150-2, and 150-3 to 150-N for the measurement object 80 and the drive command for controlling the driving of the drivers 61. The arithmetic unit 20 also receives inputs of the 3D data sets 150-1, 150-2, and 150-3 to 150-N for the measurement object 80 measured by the 3D sensor 70. The RAM 23 temporarily stores the 3D data sets 150-1, 150-2, and 150-3 to 150-N for the measurement object 80 measured by the 3D sensor 70 and functions as a work area for registration performed by the arithmetic unit 20. The arithmetic unit 20 compares the 3D data 150-S resulting from the registration with the 3D CAD data 32 representing the measurement object 80 to identify the measurement object 80. The arithmetic unit 20 may transform the coordinates representing the 3D data 150-S in the sensor coordinate system 203 to the coordinates in the robot coordinate system

201 using a known transformation matrix and estimate the position and the orientation of the measurement object 80 with respect to the robot 60.

The display 140 shows the results of various processes (e.g., an identification result of the measurement object 80) performed with the measurement program 31.

Figure 3:
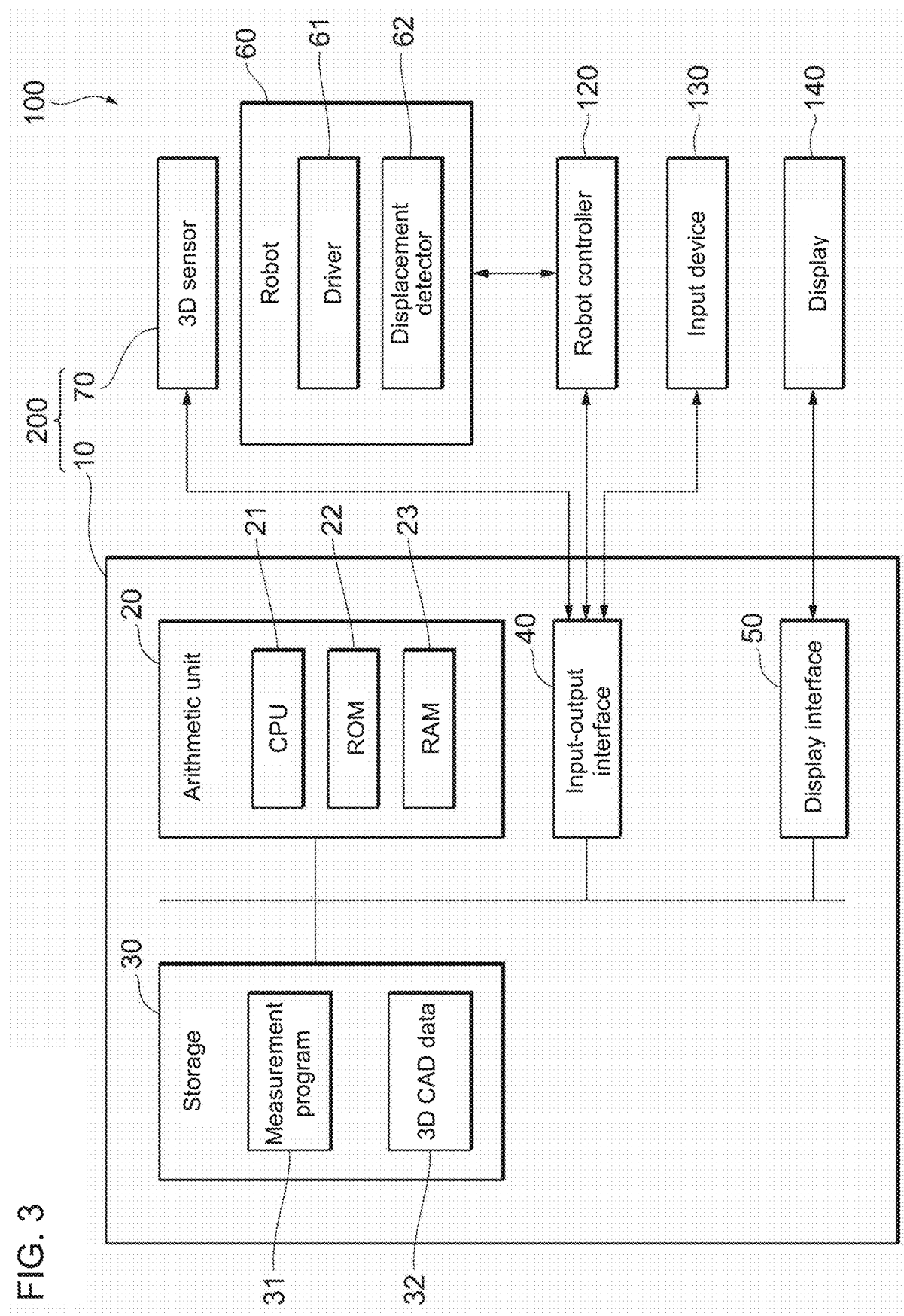
FIG. 3 is a block diagram illustrating a measurement system and a measurement device in one or more embodiments showing a hardware configuration.

Although the robot 60 includes a single driver 61 and a single displacement detector 62 in the example shown in FIG. 3, the robot 60 may include as many drivers 61 and displacement detectors 62 as the joints.

Parameter Setting

The process of associating a result from identifying the measurement object 80 for each of all possible combinations of the values of parameters specifying conditions for obtaining 3D measurement data with the parameter values will now be described with reference to FIGS. 4 to 9. 3D measurement data representing the measurement object 80 may be obtained at one or more specific measurement points of the measurement points 90-1, 90-2, and 90-3 to 90-N while the robot 60 is stopped, and 3D measurement data representing the measurement object 80 may be obtained at each measurement point other than the specific measurement points while the robot 60 is in motion. In this case, the parameters may include, for example, at least one selected from the group consisting of the number of times the measurement is performed to obtain the 3D data representing the measurement object 80, the movement distance of the 3D sensor 70, the angle at which the 3D sensor 70 measures the measurement object 80, the focus range of the 3D sensor 70, the movement speed of the 3D sensor 70, and the time intervals at which the measurement is performed to obtain 3D data representing the measurement object 80. 3D measurement data representing the measurement object 80 may be obtained while the robot 60 is stopped at all the measurement points 90-1, 90-2, and 90-3 to 90-N. In this case, the parameters may include, for example, at least one selected from the group consisting of the number of times the measurement is performed to obtain 3D data representing the measurement object 80, the movement distance of the 3D sensor 70, the angle at which the 3D sensor 70 measures the measurement object 80, the focus range of the 3D sensor 70, and the position coordinates of each of the measurement points 90-1, 90-2, and 90-3 to 90-N. The focus range of the 3D sensor 70 refers to the depth of field.

Figure 4:
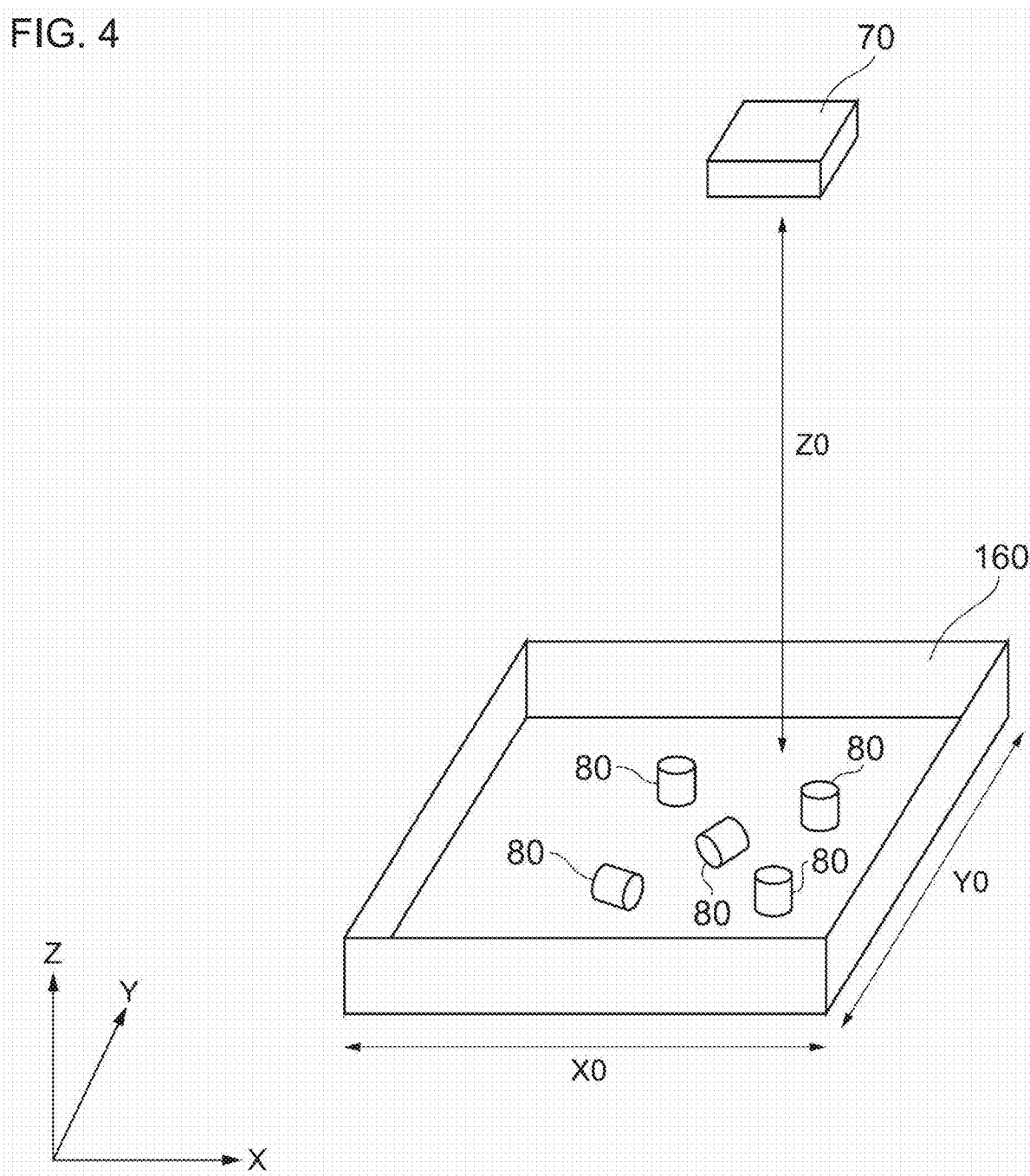
FIG. 4 is a diagram illustrating a process of associating an identification result of a measurement object for each of all possible combinations of values of multiple parameters specifying conditions for obtaining 3D measurement data with parameter values in one or more embodiments.

As shown in FIG. 4, the arithmetic unit 20 defines an orthogonal XYZ coordinate system including an XY plane, which is parallel to the placement surface of a container 160 containing randomly placed measurement objects 80, and Z-direction, which is perpendicular to the placement surface of the container 160. The container 160 has a length X0 in X-direction and a length Y0 in Y-direction. The 3D sensor 70 is located with respect to each measurement object 80 to satisfy the condition for achieving the best focus at a distance Z0 from the measurement object 80.

Figure 5:
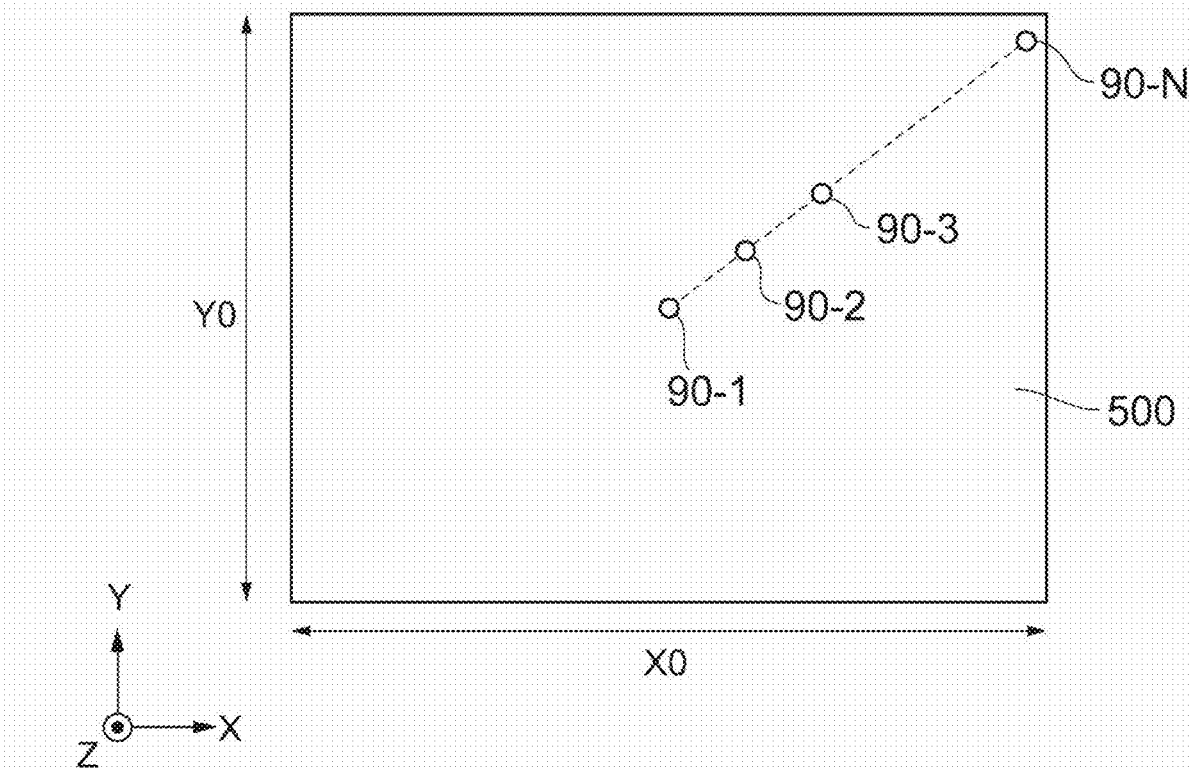
FIG. 5 is a diagram illustrating a process of associating an identification result of a measurement object for each of all possible combinations of values of multiple parameters specifying conditions for obtaining 3D measurement data with parameter values in one or more embodiments.

As shown in FIG. 5, the arithmetic unit 20 defines a plane 500 that defines a range in which the 3D sensor 70 is movable in X- and Y-directions. The plane 500 is a projection plane obtained by projecting the planar shape of the container 160 viewed in Z-direction onto the plane of Z=Z0. The plane 500 has a length in X-direction equal to the length X0 and a length in Y-direction equal to Y0.

Figure 6:
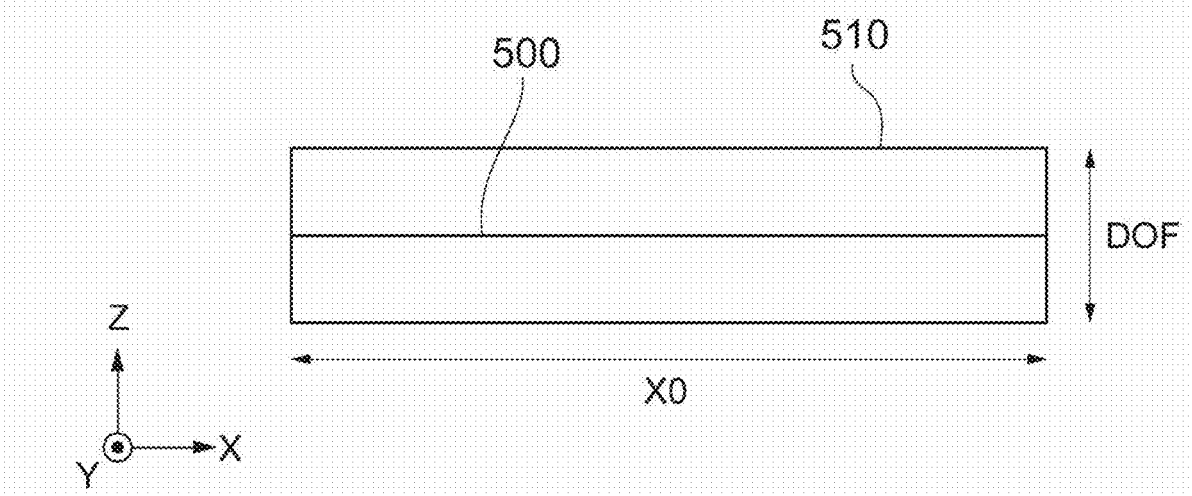
FIG. 6 is a diagram illustrating a process of associating an identification result of a measurement object for each of all possible combinations of values of multiple parameters specifying conditions for obtaining 3D measurement data with parameter values in one or more embodiments.

As shown in FIG. 6, the arithmetic unit 20 sets a range of depth of field (DOF) in Z-direction in which the 3D sensor 70 is located with respect to each measurement object 80 to satisfy the condition for achieving focus. The arithmetic unit 20 defines a 3D space 510 within the range of DOF from the plane 500 as a space defining the range in which the 3D sensor 70 is movable in X-, Y-, and Z-directions. The DOF herein corresponds to the depth of field of the 3D sensor 70. The position coordinates of the measurement points 90-1, 90-2, and 90-3 to 90-N of the 3D sensor 70 are all within the 3D space 510.

The arithmetic unit 20 obtains the 3D data sets 150-1, 150-2, and 150-3 to 150-N by measurement while randomly changing, within a predetermined range, the values of the parameters that specify the conditions for obtaining each of the 3D measurement data sets 150-1, 150-2, and 150-3 to 150-N, with each of the measurement points 90-1, 90-2, and 90-3 to 90-N of the 3D sensor 70 at position coordinates within the 3D space 510. The arithmetic unit 20 compares the 3D data 150-S obtained through registration of the 3D data sets 150-1, 150-2, and 150-3 to 150-N with the 3D CAD data 32 representing the measurement object 80 and stores the identification result (success or failure of the identification) of each measurement object 80 into the storage 30 in a manner associated with a corresponding combination of the parameter values. The range of possible values for each parameter may be set by default based on, for example, the performance or specifications of the 3D sensor 70 and the robot 60 to practically allow measurement for the 3D data representing the measurement object 80. The range of possible values for each parameter may be estimated to satisfy a priority condition designated by the user for obtaining the 3D measurement data. The priority condition will be described in detail later.

As shown in FIG. 5, the arithmetic unit 20 may set, for example, the measurement point 90-1 at the center of the plane 500 from which the 3D sensor 70 starts measurement to obtain 3D data, the measurement point 90-N on an edge of the plane 500 at which the 3D sensor 70 ends the 3D measurement, and the other measurement points 90-2 and 90-3 to 90-(N−1) on the straight line connecting the two measurement points 90-1 and 90-N. In this case, the distance between the measurement points 90-1 and 90-N is equal to the movement distance of the 3D sensor 70. When the movement speed of the 3D sensor 70 is constant, the movement time of the 3D sensor 70 can be calculated based on the movement distance and the movement speed of the 3D sensor 70. When the time intervals for obtaining the 3D measurement data are constant, the number of times the measurement is performed to obtain 3D data can be calculated based on the movement time of the 3D sensor 70 and the measurement time intervals. The angle at which the 3D sensor 70 measures the measurement object 80 is the angle at which a line segment passing through the 3D sensor 70 and the measurement object 80 intersects with a predetermined reference line (e.g., a horizontal line or a vertical line).

For example, the arithmetic unit 20 fixes the movement speed of the 3D sensor 70 at a constant speed, successively changes the time intervals for obtaining the 3D measurement data from an upper end to a lower end of a predetermined range while the 3D sensor 70 is moving at the fixed speed, and obtains the 3D measurement data representing the measurement object 80 by the number of times calculated based on each time interval at which the measurement is performed to obtain 3D data. The arithmetic unit 20 iterates such a process while successively changing the movement speed of the 3D sensor 70 from an upper end to a lower end of a predetermined range. In this manner, the arithmetic unit 20 obtains multiple sets of 3D measurement data representing each measurement object 80 while successively changing the movement speed of the 3D sensor 70 and the number of times the measurement is performed to obtain 3D data from the upper end to the lower end, compares the 3D data 150-S obtained through registration of the multiple 3D data sets with the 3D CAD data 32 representing the measurement object 80, and stores the identification result (success or failure of the identification) of the measurement object 80 into the storage 30 in a manner associated with the corresponding combination of the parameter values.

Each of the measurement points 90-1, 90-2, and 90-3 to 90-N may be at any position coordinates within the 3D space 510, other than at the example coordinates shown in FIG. 5. The measurement points 90-1, 90-2, and 90-3 to 90-N may be at position coordinates at which the 3D sensor 70 measures the measurement object 80 at different angles. The 3D sensor 70 may move along a curve or a combination of a straight line and a curve, rather than along a straight line.

Figure 7:
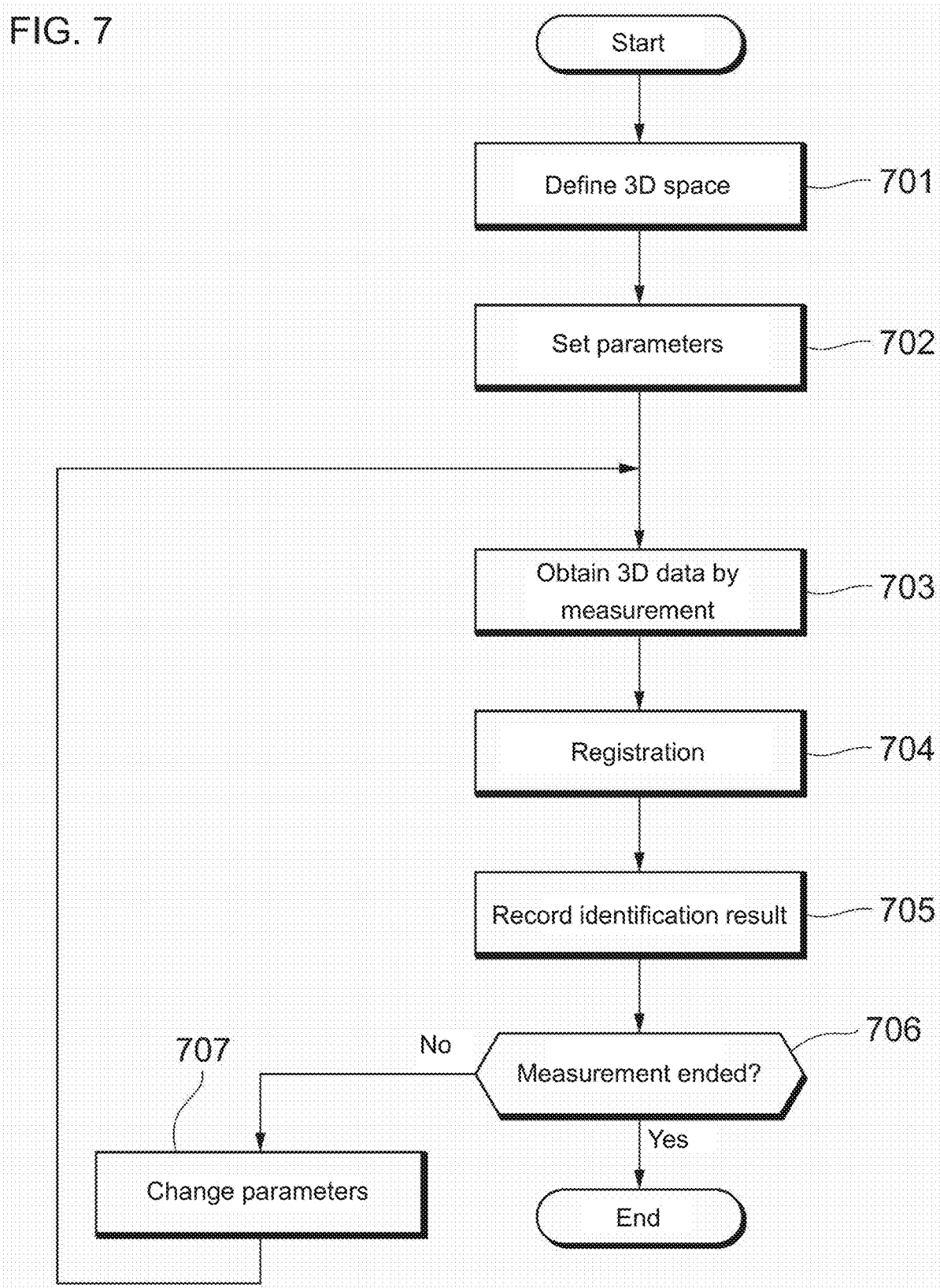
FIG. 7 is a flowchart illustrating an example process of associating an identification result of a measurement object for each of all possible combinations of values of multiple parameters specifying conditions for obtaining 3D measurement data with parameter values in one or more embodiments.

FIG. 7 is a flowchart of an example process of associating an identification result of the measurement object 80 for each of all possible combinations of the values of the parameters specifying the conditions for obtaining the 3D measurement data with the corresponding parameter values.

In step 701, the arithmetic unit 20 defines, based on the values X0, Y0, and Z0 described above, the 3D space 510 that defines the range in which the 3D sensor 70 is movable in X-, Y-, and Z-directions.

In step 702, the arithmetic unit 20 sets, based on information for the 3D space 510 defined in step 701, the values of the parameters specifying the conditions for obtaining the 3D measurement data representing the measurement object 80 within a predetermined range.

In step 703, the arithmetic unit 20 outputs, based on the parameter values set in step 702 (or changed in step 707 described later), a drive command for instructing the drivers 61 that drive the joints of the robot 60 to change the position of the 3D sensor 70 with respect to the measurement object 80 and outputs a measurement command for instructing the 3D sensor 70 to measure the measurement object 80 to obtain the 3D data sets 150-1, 150-2, and 150-3 to 150-N for the measurement object 80 at the measurement points 90-1, 90-2, and 90-3 to 90-N.

In step 704, the arithmetic unit 20 registers the 3D data sets 150-1, 150-2, and 150-3 to 150-N obtained in step 703 to obtain the 3D data 150-S.

In step 705, the arithmetic unit 20 compares the 3D data 150-S obtained through the registration performed in step 704 with the 3D CAD data 32 representing the measurement object 80 and stores the identification result (success or failure of the identification) of the measurement object 80 into the storage 30 in a manner associated with the combination of the parameter values set in step 702.

In step 706, the arithmetic unit 20 determines whether the processing in steps 703 to 705 has been performed on all possible combinations of the values of the parameters that specify the conditions for obtaining the 3D measurement data representing the measurement object 80.

In step 707, the arithmetic unit 20 changes the values of the parameters specifying the conditions for obtaining the 3D measurement data representing the measurement object 80 within a predetermined range.

Figure 8:
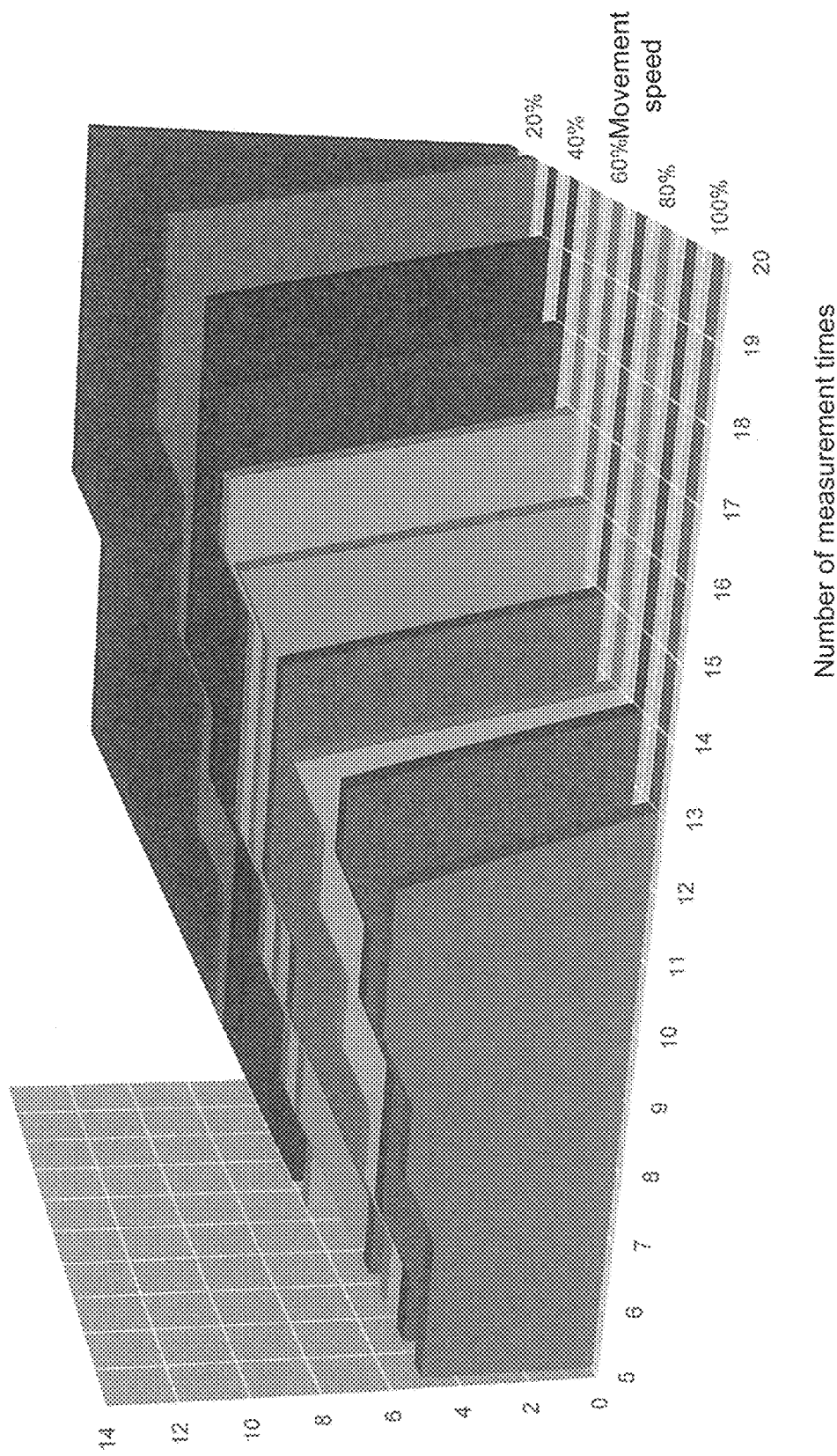
FIG. 8 is a graph illustrating example identification results of a measurement object in one or more embodiments.

FIG. 8 is a graph showing example identification results of the measurement object 80. This 3D graph shows the successful identification count of the measurement object 80 against the movement speed of the 3D sensor 70 and the number of times the measurement is performed to obtain 3D data. The successful identification count of the measurement object 80 refers to the number of times identification of the measurement object 80 has been successful out of the total number of times the measurement is performed to obtain 3D data. The movement speeds of 20%, 40%, 60%, 80%, and 100% of the 3D sensor 70 each indicate the ratio of the movement speed of the 3D sensor 70 to a predetermined speed.

Figure 9:
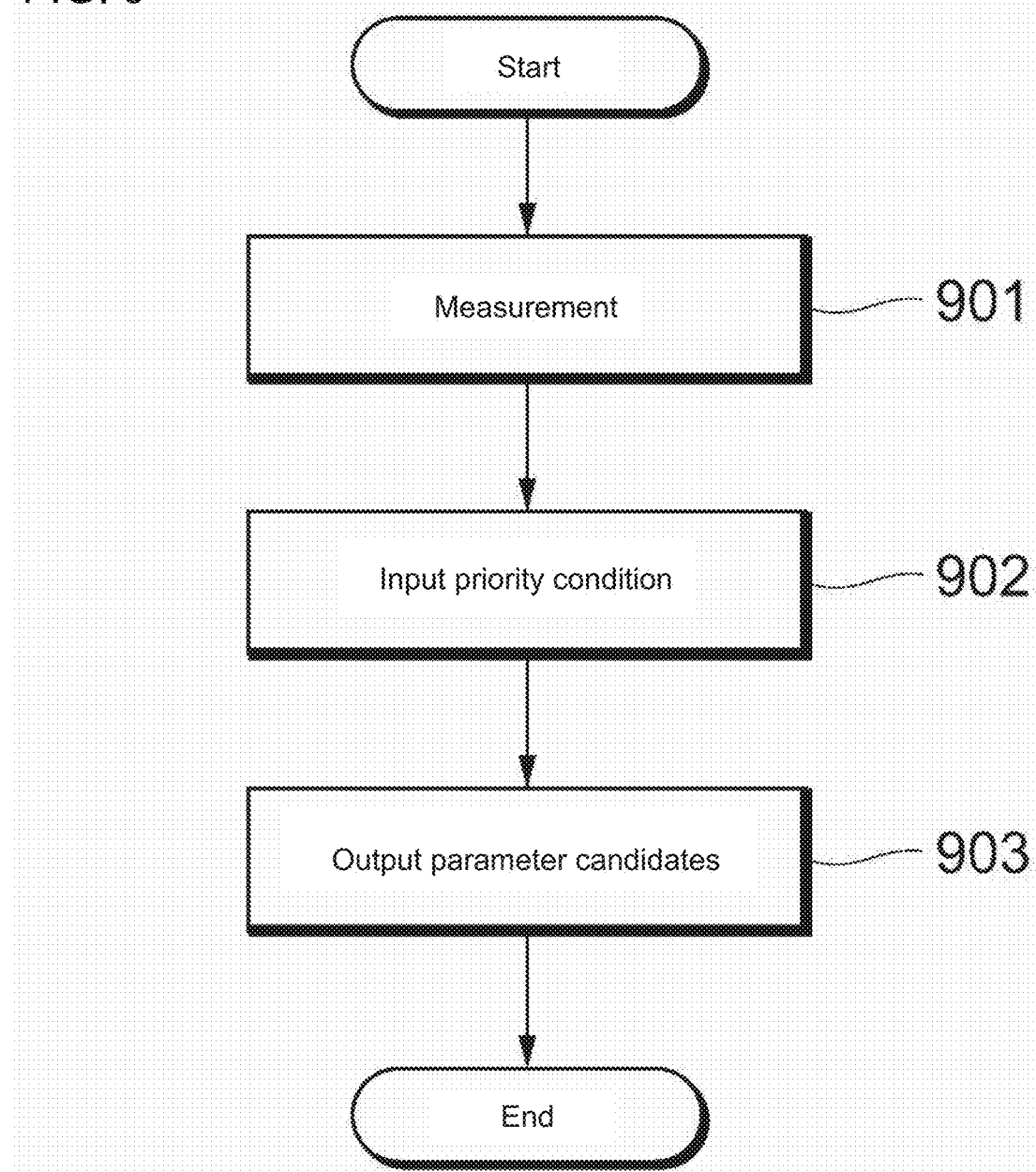
FIG. 9 is a flowchart illustrating a process of outputting one or more combinations of values of parameters satisfying a priority condition for obtaining 3D measurement data in one or more embodiments.

FIG. 9 is a flowchart of a process of outputting one or more combinations of the values of parameters satisfying a priority condition for obtaining the 3D measurement data sets 150-1, 150-2, and 150-3 to 150-N.

In step 901, the arithmetic unit 20 performs, for all combinations of the parameter values within a range of possible values for each parameter specifying the conditions for obtaining the 3D measurement data representing the measurement object 80, measurement for multiple 3D data sets, registration of the obtained 3D measurement data sets, identification of the measurement object 80 based on the 3D data 150-S obtained through the registration, and association of the identification result of the measurement object 80 with the parameter values. These processes are the same as the processes performed in steps 701 to 707 in the flowchart shown in FIG. 7.

In step 902, the arithmetic unit 20 receives designation of a priority condition for obtaining the 3D measurement data representing the measurement object 80 from the user. The user can operate the input device 130 to input the priority condition for obtaining the 3D measurement data into the computer system 10. The user may designate, for example, the maximum successful identification count for the measurement object 80 as a priority condition for obtaining the 3D measurement data. The user may designate, for example, the average successful identification count or more than the average successful identification count for the measurement object 80 and the shortest time for obtaining the 3D measurement data representing the measurement object 80 as priority conditions for obtaining the 3D measurement data. The user may designate, for example, the average successful identification count or more than the average successful identification count for the measurement object 80 and the highest movement speed of the 3D sensor 70 as priority conditions for obtaining the 3D measurement data. The user may designate, for example, a well-balanced relationship between the successful identification count of the measurement object 80, the time taken for obtaining the 3D measurement data representing the measurement object 80, and the movement speed of the 3D sensor 70 as a priority condition for obtaining the 3D measurement data.

In step 903, the arithmetic unit 20 outputs to, for example, the display 140, one or more combinations of the values of the parameters satisfying the priority condition designated by the user. The combinations are arranged in order of a higher degree of satisfying the priority condition based on the association between the values of the parameters specifying the conditions for obtaining the 3D measurement data and the identification results of the measurement object 80. In this case, the arithmetic unit 20 may output the highest-order M combinations with a high degree of satisfying the priority condition selected from all combinations of the parameter values, where M is an integer greater than or equal to 2. The arithmetic unit 20 may output a single optimum combination of the values of the parameters satisfying the priority condition designated by the user.

The order of steps 901 and 902 may be exchanged. When performing the process in step 902 before the process in step 901, the arithmetic unit 20 may narrow, in steps 701 and 707, the range of possible values for each parameter specifying the conditions for obtaining the 3D measurement data representing the measurement object 80 to the range of values for each parameter satisfying the priority condition designated by the user for obtaining the 3D measurement data. For example, the user may designate the average successful identification count or more than the average successful identification count of the measurement object 80 and the highest movement speed of the 3D sensor 70 as priority conditions for obtaining the 3D measurement data. In this case, the arithmetic unit 20 may narrow the range of possible values for each parameter specifying the conditions for obtaining the 3D measurement data to the range of parameter values that allow the 3D sensor 70 to move at a predetermined speed or higher.

Functional Configuration

Figure 10:
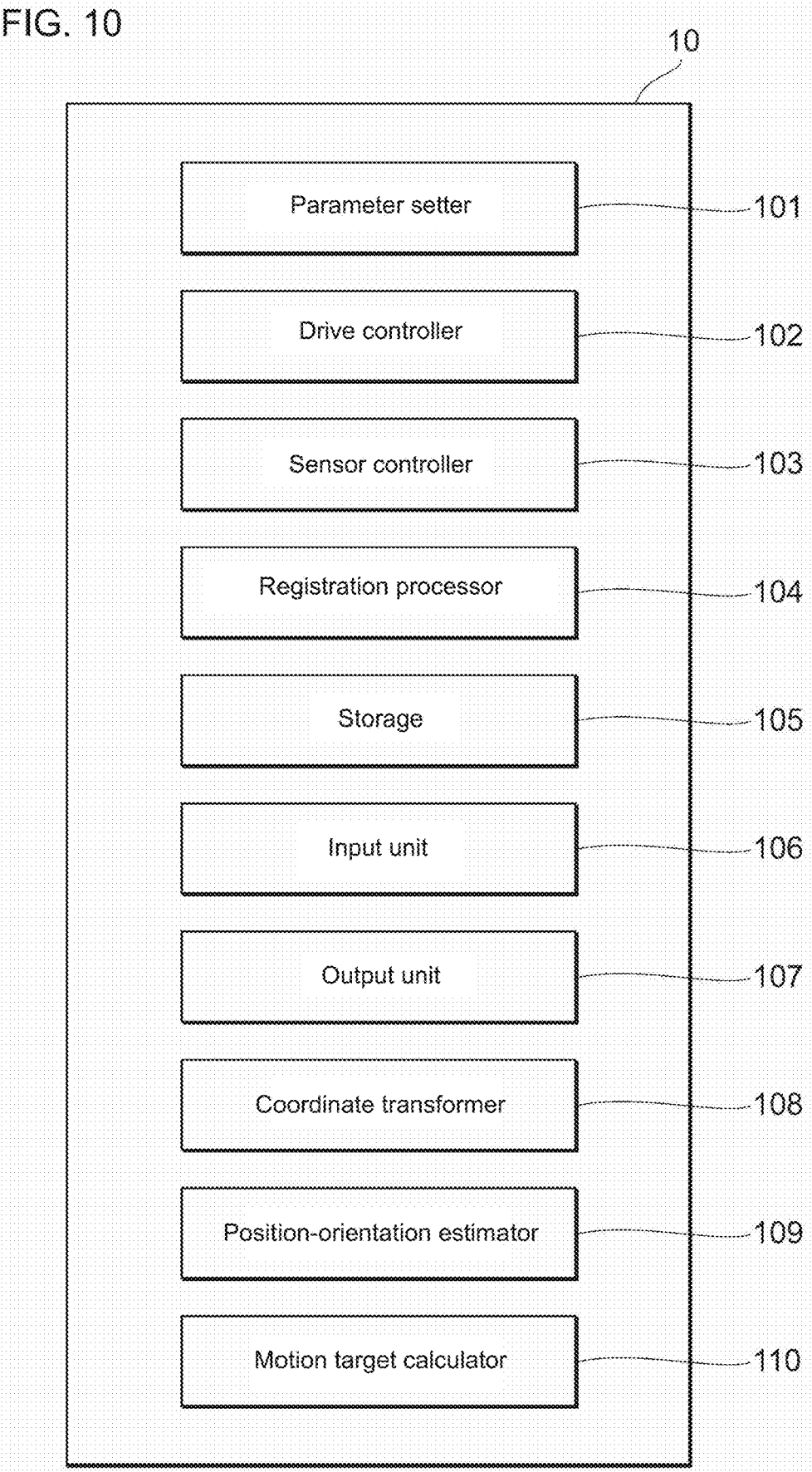
FIG. 10 is a functional block diagram of a computer system in one or more embodiments.

FIG. 10 is a functional block diagram of the computer system 10 in the embodiment of the present invention. The computer system 10 includes the hardware resources (the arithmetic unit 20, the storage 30, and the input-output interface 40) that operate in cooperation with the measurement program 31 to implement the functional components including a parameter setter 101, a drive controller 102, a sensor controller 103, a registration processor 104, a storage 105, an input unit 106, an output unit 107, a coordinate transformer 108, a position-orientation estimator 109, and a motion target calculator 110.

The parameter setter 101 sets and changes, within a predetermined range (e.g., a default range or a range of parameter values estimated to satisfy the priority condition designated by the user for obtaining 3D measurement data), the values of the parameters specifying the conditions for obtaining 3D measurement data sets for the measurement objects 80 (steps 702 and 707 in FIG. 7). The 3D measurement data sets are obtained at the measurement points 90-1, 90-2, and 90-3 to 90-N at which the 3D sensor 70 is at different positions with respect to the measurement object 80. The 3D measurement data sets include a 3D data set for the measurement object 80 obtained at a specific measurement point of the measurement points and a 3D measurement data set for the measurement object 80 obtained at each of measurement points other than the specific measurement point. The 3D measurement data set obtained at each measurement point other than the specific measurement point is to be registered to the 3D measurement data set obtained at the specific measurement point.

The drive controller 102 outputs, for each change of the value of at least one of the parameters specifying the conditions for obtaining each 3D measurement data set, a drive command instructing the drivers 61 that drive the joints of the robot 60 to change, based on the parameter values resulting from the change, the position of the 3D sensor 70 with respect to the measurement object 80 (step 703 in FIG. 7).

The sensor controller 103 controls, for each change of the value of at least one of the parameters specifying the conditions for obtaining each 3D measurement data set, the 3D sensor 70 to measure the measurement object 80 to obtain the 3D data sets 150-1, 150-2, and 150-3 to 150-N for the measurement object 80 at the measurement points 90-1, 90-2, and 90-3 to 90-N based on the parameter values resulting from the change (step 703 in FIG. 7).

The registration processor 104 registers, for each change of the value of at least one of the parameters specifying the conditions for obtaining each 3D measurement data set, the 3D measurement data obtained at each measurement point other than a specific measurement point to the 3D measurement data obtained at the specific measurement point (step 704 in FIG. 7).

The storage 105 stores, for each change of the value of at least one of the parameters specifying the conditions for obtaining each 3D measurement data set, the identification result of the measurement object 80 based on the 3D data 150-S obtained through the registration in association with parameter values (step 705 in FIG. 7).

The input unit 106 receives designation of a priority condition for obtaining the 3D measurement data from the user (step 902 in FIG. 9).

The output unit 107 outputs to, for example, the display 140, one or more combinations of the values of the parameters satisfying the priority condition designated by the user based on the association between the identification results of the measurement object 80 and the values of the parameters specifying the conditions for obtaining each 3D measurement data set. The combinations are arranged in order of a higher degree of satisfying the priority condition (step 903 in FIG. 9). The user can select, from the combination(s) of the values of the parameters satisfying the priority condition, any one combination of parameter values by operating the input device 130. The parameter setter 101 sets the values of the parameters specifying the condition for obtaining each 3D measurement data set based on the user selection.

The measurement system 100 controls the robot 60 and the 3D sensor 70 based on the combination of the parameter values selected by the user from the combinations of values of the parameters satisfying the priority condition specified by the user to obtain the 3D measurement data sets 150-1, 150-2, and 150-3 to 150-N for the measurement object 80. The measurement system 100 registers the 3D data sets 150-1, 150-2, and 150-3 to 150-N to obtain the 3D data 110-S.

The coordinate transformer 108 transforms the coordinates representing the 3D data 110-S in the sensor coordinate system 203 to the coordinates in the robot coordinate system 201.

The position-orientation estimator 109 estimates the position and the orientation of the measurement object 80 with respect to the robot 60 based on the 3D data defined in the robot coordinate system 201 resulting from the coordinate transformation performed by the coordinate transformer 108.

The motion target calculator 110 calculates motion targets for the robot 60 to manipulate the measurement object 80 based on the position and the orientation of the measurement object 80 with respect to the robot 60. The motion targets include a target position and a target orientation of the robot 60 to manipulate (e.g., grip, suck, move, assemble, or insert) the measurement object 80.

The components described above (the parameter setter 101, the drive controller 102, the sensor controller 103, the registration processor 104, the storage 105, the input unit 106, the output unit 107, the coordinate transformer 108, the position-orientation estimator 109, and the motion target calculator 110) may be implemented by, for example, dedicated hardware resources (e.g., application-specific integrated circuits or ASICs, or field-programmable gate arrays or FPGAs), rather than by the hardware resources (the arithmetic unit 20, the storage 30, the input-output interface 40) in the computer system 10 operating in cooperation with the measurement program 31.

The coordinate transformer 108, the position-orientation estimator 109, and the motion target calculator 110 are optional components. The computer system 10 may replace the optional components with other functional components corresponding to the measurement intended by the measurement system 100. For example, the measurement system 100 may be a system for visual inspection to determine any defect on an inspection object 80. In this case, the measurement system 100 eliminates the coordinate transformer 108, the position-orientation estimator 109, and the motion target calculator 110.

The measurement object 80 may be identified with higher accuracy with the multiple measurement 3D data sets 150-1, 150-2, and 150-3 to 150-N obtained at the multiple different measurement points 90-1, 90-2, and 90-3 to 90-N than with a single 3D measurement data set obtained at a single measurement point. However, obtaining multiple 3D measurement data sets at multiple different measurement points can increase the difficulty of manually setting the parameters specifying the conditions for obtaining the 3D measurement data sets. In the measurement system 100 in the embodiment of the present invention, the user simply selects any one combination from one or more combinations of the parameter values output as satisfying the priority condition designated by the user. This eliminates manual adjustment of complicated parameters. The user can thus easily and rapidly set the parameters satisfying the priority condition designated by the user without manually adjusting the complicated parameters. This also increases the ratio of identification success of the measurement object 80.

The robot 60 may be any robot for a service industry (e.g., an operating robot, a medical robot, a cleaning robot, a rescue robot, or a security robot), rather than an industrial robot for factory automation.

The above embodiments may be partially or entirely expressed in, but not limited to, the following forms.

APPENDIX 1

A measurement device (200), comprising:
a three-dimensional sensor (70) mountable on a robot (60), the three-dimensional sensor (70) being configured to measure a measurement object (80) to obtain three-dimensional data sets represented by three-dimensional coordinates indicating points on a surface of the measurement object (80);
a parameter setter (101) configured to set and change, within a predetermined range, values of a plurality of parameters specifying conditions for obtaining the three-dimensional data sets by measurement, the three-dimensional data sets being obtained by measurement at a plurality of measurement points at which the three-dimensional sensor (70) is at different positions with respect to the measurement object (80), the three-dimensional data sets including a three-dimensional data set obtained by measurement at a specific measurement point of the plurality of measurement points and a three-dimensional data set obtained by measurement at a measurement point other than the specific measurement point, the three-dimensional data set obtained by measurement at the measurement point other than the specific measurement point being a data set to be registered to the three-dimensional data set obtained by measurement at the specific measurement point;
a drive controller (102) configured to output, based on the parameter values resulting from the setting or the change, a drive command instructing a driver (61) configured to drive a joint of the robot (60) to change a position of the three-dimensional sensor (70) with respect to the measurement object (80);
a sensor controller (103) configured to control, based on the parameter values resulting from the setting or the change, the three-dimensional sensor (70) to measure the measurement object (80) at the plurality of measurement points to obtain the three-dimensional data sets representing the measurement object (80);
a registration processor (104) configured to register the three-dimensional data set obtained by measurement at the measurement point other than the specific measurement point to the three-dimensional data set obtained by measurement at the specific measurement point;
a storage (105) configured to store a result from identifying the measurement object (80) based on three-dimensional data obtained through the registration in association with the parameter values resulting from the setting or the change;
an input unit (106) configured to receive, from a user, designation of a priority condition for obtaining three-dimensional data by measurement; and
an output unit (107) configured to output one or more combinations of values of parameters satisfying the priority condition based on association between identification results of the measurement object (80) and the parameter values resulting from the setting or the change, the one or more combinations being arranged in order of a higher degree of satisfying the priority condition.

APPENDIX 2

The measurement device (200) according to Appendix 1, wherein
the plurality of parameters include at least one parameter selected from the group consisting of the number of times measurement is performed to obtain the three-dimensional data sets, a movement distance of the three-dimensional sensor, a movement speed of the three-dimensional sensor, time intervals at which measurement is performed to obtain the three-dimensional data sets, an angle at which the three-dimensional sensor measures the measurement object, a focus range of the three-dimensional sensor, and position coordinates of each of the plurality of measurement points.

APPENDIX 3

The measurement device (200) according to Appendix 1 or Appendix 2, wherein
the predetermined range is estimated to satisfy the priority condition designated by the user using the input unit.

APPENDIX 4

A measurement method implementable by a measurement device (200) including a three-dimensional sensor (70) mountable on a robot (60), the three-dimensional sensor (70) being configured to measure a measurement object (80) to obtain three-dimensional data sets represented by three-dimensional coordinates indicating points on a surface of the measurement object (80), the measurement method comprising:
(702, 707) setting and changing, within a predetermined range, values of a plurality of parameters specifying conditions for obtaining the three-dimensional data sets by measurement, the three-dimensional data sets being obtained by measurement at a plurality of measurement points at which the three-dimensional sensor (70) is at different positions with respect to the measurement object (80), the three-dimensional data sets including a three-dimensional data set obtained by measurement at a specific measurement point of the plurality of measurement points and a three-dimensional data set obtained by measurement at a measurement point other than the specific measurement point, the three-dimensional data set obtained by measurement at the measurement point other than the specific measurement point being a data set to be registered to the three-dimensional data set obtained by measurement at the specific measurement point;

(703) outputting, based on the parameter values resulting from the setting or the change, a drive command instructing a driver (61) configured to drive a joint of the robot (60) to change a position of the three-dimensional sensor (70) with respect to the measurement object (80);

(703) controlling, based on the parameter values resulting from the setting or the change, the three-dimensional sensor (70) to measure the measurement object (80) at the plurality of measurement points to obtain the three-dimensional data sets representing the measurement object (80);

(704) registering the three-dimensional data set obtained by measurement at the measurement point other than the specific measurement point to the three-dimensional data set obtained by measurement at the specific measurement point;

(705) storing a result from identifying the measurement object (80) based on three-dimensional data obtained through the registration in association with the parameter values resulting from the setting or the change;

(902) receiving, from a user, designation of a priority condition for obtaining three-dimensional data by measurement; and (903) outputting one or more combinations of values of parameters satisfying the priority condition based on association between identification results of the measurement object (80) and the parameter values resulting from the setting or the change, the one or more combinations being arranged in order of a higher degree of satisfying the priority condition.

APPENDIX 5

A measurement program (31) executable by a measurement device (200) including a three-dimensional sensor (70) mountable on a robot (60), the three-dimensional sensor (70) being configured to measure a measurement object (80) to obtain three-dimensional data sets represented by three-dimensional coordinates indicating points on a surface of the measurement object (80), the measurement program (31) being executable by the measurement device (200) to perform operations comprising:

(702, 707) setting and changing, within a predetermined range, values of a plurality of parameters specifying conditions for obtaining the three-dimensional data sets by measurement, the three-dimensional data sets being obtained by measurement at a plurality of measurement points at which the three-dimensional sensor (70) is at different positions with respect to the measurement object (80), the three-dimensional data sets including a three-dimensional data set obtained by measurement at a specific measurement point of the plurality of measurement points and a three-dimensional data set obtained by measurement at a measurement point other than the specific measurement point, the three-dimensional data set obtained by measurement at the measurement point other than the specific measurement point being a data set to be registered to the three-dimensional data set obtained by measurement at the specific measurement point;

(703) outputting, based on the parameter values resulting from the setting or the change, a drive command instructing a driver (61) configured to drive a joint of the robot (60) to change a position of the three-dimensional sensor (70) with respect to the measurement object (80);

(703) controlling, based on the parameter values resulting from the setting or the change, the three-dimensional sensor (70) to measure the measurement object (80) at the plurality of measurement points to obtain the three-dimensional data sets representing the measurement object (80);

(704) registering the three-dimensional data set obtained by measurement at the measurement point other than the specific measurement point to the three-dimensional data set obtained by measurement at the specific measurement point;

(705) storing a result from identifying the measurement object (80) based on three-dimensional data obtained through the registration in association with the parameter values resulting from the setting or the change;

(902) receiving, from a user, designation of a priority condition for obtaining three-dimensional data by measurement; and (903) outputting one or more combinations of values of parameters satisfying the priority condition based on association between identification results of the measurement object (80) and the parameter values resulting from the setting or the change, the one or more combinations being arranged in order of a higher degree of satisfying the priority condition.

REFERENCE SIGNS LIST 10 computer system
20 arithmetic unit
21 CPU
22 ROM
23 RAM
30 storage
31 measurement program
32 CAD data
40 input-output interface
50 display interface
60 robot
61 driver
62 displacement detector
70 3D sensor
80 measurement object
90 measurement point
100 measurement system
101 parameter setter
102 drive controller
103 sensor controller
104 registration processor
105 storage
106 input unit
107 output unit
108 coordinate transformer
109 position-orientation estimator
110 motion target calculator
120 robot controller
130 input device
140 display
200 measurement device

The invention claimed is:

1. A measurement device, comprising:
a three-dimensional sensor mountable on a robot, the three-dimensional sensor being configured to measure a measurement object to obtain three-dimensional data sets represented by three-dimensional coordinates indicating points on a surface of the measurement object;
a parameter setter configured to set and change, within a predetermined range, values of a plurality of parameters specifying conditions for obtaining the three-dimensional data sets by measurement, the three-dimensional data sets being obtained by measurement at a plurality of measurement points at which the three-dimensional sensor is at different positions with respect to the measurement object, the three-dimensional data sets including a three-dimensional data set obtained by measurement at a specific measurement point of the plurality of measurement points while the robot is stopped, and a three-dimensional data set obtained by measurement at a measurement point other than the specific measurement point while the robot is in motion, the three-dimensional data set obtained by measurement at the measurement point other than the specific measurement point being a data set to be registered to the three-dimensional data set obtained by measurement at the specific measurement point;
a drive controller configured to output, based on the parameter values resulting from the setting or the change, a drive command instructing a driver configured to drive a joint of the robot to change a position of the three-dimensional sensor with respect to the measurement object;
a sensor controller configured to control, based on the parameter values resulting from the setting or the change, the three-dimensional sensor to measure the measurement object at the plurality of measurement points to obtain the three-dimensional data sets representing the measurement object;
a registration processor configured to register the three-dimensional data set obtained by measurement at the measurement point other than the specific measurement point to the three-dimensional data set obtained by measurement at the specific measurement point;
a storage configured to store a result from identifying the measurement object based on three-dimensional data obtained through the registration in association with the parameter values resulting from the setting or the change;
an input unit configured to receive a user designation of a priority condition for obtaining three-dimensional data by measurement; and
an output unit configured to output one or more combinations of values of parameters satisfying the priority condition based on association between identification results of the measurement object and the parameter values resulting from the setting or the change, the one or more combinations being arranged in order of a higher degree of satisfying the priority condition.

2. The measurement device according to claim 1, wherein the plurality of parameters comprise at least one parameter selected from the group consisting of the number of times measurement is performed to obtain the three-dimensional data sets, a movement distance of the three-dimensional sensor, a movement speed of the three-dimensional sensor, time intervals at which measurement is performed to obtain the three-dimensional data sets, an angle at which the three-dimensional sensor measures the measurement object, a focus range of the three-dimensional sensor, and position coordinates of each of the plurality of measurement points.

3. The measurement device according to claim 2, wherein the predetermined range is estimated to satisfy the designated priority condition received by the input unit.

4. The measurement device according to claim 1, wherein the predetermined range is estimated to satisfy the designated priority condition received by the input unit.

5. A measurement method implementable by a measurement device including a three-dimensional sensor mountable on a robot, the three-dimensional sensor being configured to measure a measurement object to obtain three-dimensional data sets represented by three-dimensional coordinates indicating points on a surface of the measurement object, the measurement method comprising:
setting and changing, within a predetermined range, values of a plurality of parameters specifying conditions for obtaining the three-dimensional data sets by measurement, the three-dimensional data sets being obtained by measurement at a plurality of measurement points at which the three-dimensional sensor is at different positions with respect to the measurement object, the three-dimensional data sets including a three-dimensional data set obtained by measurement at a specific measurement point of the plurality of measurement points while the robot is stopped, and a three-dimensional data set obtained by measurement at a measurement point other than the specific measurement point while the robot is in motion, the three-dimensional data set obtained by measurement at the measurement point other than the specific measurement point being a data set to be registered to the three-dimensional data set obtained by measurement at the specific measurement point;
outputting, based on the parameter values resulting from the setting or the change, a drive command instructing a driver configured to drive a joint of the robot to change a position of the three-dimensional sensor with respect to the measurement object;
controlling, based on the parameter values resulting from the setting or the change, the three-dimensional sensor to measure the measurement object at the plurality of measurement points to obtain the three-dimensional data sets representing the measurement object;
registering the three-dimensional data set obtained by measurement at the measurement point other than the specific measurement point to the three-dimensional data set obtained by measurement at the specific measurement point;
storing a result from identifying the measurement object based on three-dimensional data obtained through the registration in association with the parameter values resulting from the setting or the change;
receiving a user designation of a priority condition for obtaining three-dimensional data by measurement; and
outputting one or more combinations of values of parameters satisfying the priority condition based on association between identification results of the measurement object and the parameter values resulting from the setting or the change, the one or more combinations being arranged in order of a higher degree of satisfying the priority condition.

6. A non-transitory computer-readable storage medium storing a measurement program executable by a measurement device including a three-dimensional sensor mountable on a robot, the three-dimensional sensor being configured to measure a measurement object to obtain three-dimensional data sets represented by three-dimensional coordinates indicating points on a surface of the measurement object, the measurement program, which when read and executed, causes a processor of the measurement device to perform operations comprising:

setting and changing, within a predetermined range, values of a plurality of parameters specifying conditions for obtaining the three-dimensional data sets by measurement, the three-dimensional data sets being obtained by measurement at a plurality of measurement points at which the three-dimensional sensor is at different positions with respect to the measurement object, the three-dimensional data sets including a three-dimensional data set obtained by measurement at a specific measurement point of the plurality of measurement points while the robot is stopped, and a three-dimensional data set obtained by measurement at a measurement point other than the specific measurement point while the robot is in motion, the three-dimensional data set obtained by measurement at the measurement point other than the specific measurement point being a data set to be registered to the three-dimensional data set obtained by measurement at the specific measurement point;

outputting, based on the parameter values resulting from the setting or the change, a drive command instructing a driver configured to drive a joint of the robot to change a position of the three-dimensional sensor with respect to the measurement object;

controlling, based on the parameter values resulting from the setting or the change, the three-dimensional sensor to measure the measurement object at the plurality of measurement points to obtain the three-dimensional data sets representing the measurement object;

registering the three-dimensional data set obtained by measurement at the measurement point other than the specific measurement point to the three-dimensional data set obtained by measurement at the specific measurement point;

storing a result from identifying the measurement object based on three-dimensional data obtained through the registration in association with the parameter values resulting from the setting or the change;

receiving a user designation of a priority condition for obtaining three-dimensional data by measurement; and outputting one or more combinations of values of parameters satisfying the priority condition based on association between identification results of the measurement object and the parameter values resulting from the setting or the change, the one or more combinations being arranged in order of a higher degree of satisfying the priority condition.

\* \* \* \* \*